United States Patent
Flynn (10) Patent No.: US 9,494,258 B2
(45) Date of Patent: Nov. 15, 2016

(54) TUBE-RETAINING CLIP ASSEMBLY

(71) Applicant: ILLINOIS TOOL WORKS INC., Glenview, IL (US)

(72) Inventor: Gregory S. Flynn, Lake Orion, MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/779,034

(22) PCT Filed: Feb. 17, 2014

(86) PCT No.: PCT/US2014/016698
§ 371 (c)(1),
(2) Date: Sep. 22, 2015

(87) PCT Pub. No.: WO2014/158437
PCT Pub. Date: Oct. 2, 2014

(65) Prior Publication Data
US 2016/0053918 A1    Feb. 25, 2016

Related U.S. Application Data

(60) Provisional application No. 61/806,510, filed on Mar. 29, 2013, provisional application No. 61/840,110, filed on Jun. 27, 2013.

(51) Int. Cl.
*F16L 3/22* (2006.01)
*F16L 3/13* (2006.01)
*F16L 3/237* (2006.01)

(52) U.S. Cl.
CPC . *F16L 3/13* (2013.01); *F16L 3/237* (2013.01)

(58) Field of Classification Search
CPC ............ F16L 3/223; F16L 3/13; F16L 3/1075; F16L 3/237; F16B 9/023; F16B 2/20;
(Continued)

(56) References Cited

U.S. PATENT DOCUMENTS 4,291,855 A * 9/1981 Schenkel .................. F16L 3/12
                                                         24/339
4,295,618 A * 10/1981 Morota .................... F16L 3/237
                                                         248/73
(Continued)

FOREIGN PATENT DOCUMENTS

EP    1094265 A1    4/2001
EP    2428715 A1    3/2012
(Continued)

OTHER PUBLICATIONS

ISR and WO for PCT/US2014/016698 mailed May 19, 2014.

*Primary Examiner* — Kimberly Wood
(74) *Attorney, Agent, or Firm* — The Small Patent Law Group, LLC; Joseph M. Butscher (57) ABSTRACT

A clip assembly is configured to securely connect a tubular member to a structure. The clip assembly may include a base connected to first and second lateral walls, and a tube cradle connected to the base and the lateral walls. The tube cradle defines a tube-receiving channel configured to receive the tubular member. First and second tube-retaining locking arms are configured to securely retain the tubular member within the tube-receiving channel. The first and second tube-retaining locking arms are configured to flex toward the first and second lateral walls, respectively, as the tubular member is inserted into the tube-receiving channel. The first and second tube-retaining locking arms securely connect to the first and second lateral walls, respectively, when the tubular member is received within the tube-receiving channel to securely retain the tubular member within the tube-receiving channel.

13 Claims, 4 Drawing Sheets

(58) Field of Classification Search
CPC .............. A61M 16/087; A61M 5/1418; A61M 2209/082
USPC ............... 248/74.1, 68.1, 65, 49, 73, 72, 62; 24/16 PB
See application file for complete search history.

(56) References Cited

U.S. PATENT DOCUMENTS

| | | | | |
|---|---|---|---|---|
| 4,566,660 | A * | 1/1986 | Anscher | F16L 3/13 24/453 |
| 4,591,285 | A * | 5/1986 | Nelson | E05B 79/12 403/11 |
| 4,624,432 | A * | 11/1986 | Salacuse | F16L 3/1203 248/316.5 |
| 5,094,578 | A * | 3/1992 | Light | F16B 2/10 248/74.5 |
| 5,230,496 | A * | 7/1993 | Shillington | A61M 5/1418 24/487 |
| 5,277,387 | A * | 1/1994 | Lewis | F16L 3/1041 24/482 |
| 5,851,097 | A * | 12/1998 | Shereyk | F16B 5/065 411/508 |
| 6,216,986 | B1 | 4/2001 | Kwilosz | |
| 6,554,232 | B1 * | 4/2003 | Macris | F16B 5/0685 248/65 |
| 7,326,855 | B2 * | 2/2008 | Moffatt | F16L 3/22 174/138 G |
| 8,328,488 | B2 | 12/2012 | Luk | |
| 8,708,289 | B2 * | 4/2014 | Allenbach | F16L 3/2235 248/68.1 |
| 9,016,639 | B2 * | 4/2015 | Kuhm | F16L 3/1203 248/68.1 |
| 9,022,327 | B2 * | 5/2015 | Wallingford | H02G 3/26 248/49 |
| 9,109,617 | B2 * | 8/2015 | Diep | F16L 3/1075 |
| 2004/0065785 | A1 * | 4/2004 | Miura | B60R 16/0215 248/62 |
| 2004/0108421 | A1 * | 6/2004 | Yuta | B60N 3/046 248/71 |
| 2005/0098688 | A1 * | 5/2005 | Miarka | F16L 3/223 248/68.1 |
| 2006/0060725 | A1 * | 3/2006 | Kobayashi | F16L 3/12 248/49 |
| 2006/0099049 | A1 | 5/2006 | Peterson | |
| 2006/0273229 | A1 * | 12/2006 | Peterson | F16B 21/088 248/316.5 |
| 2008/0217488 | A1 * | 9/2008 | Carretero | F16L 3/13 248/65 |
| 2013/0146720 | A1 * | 6/2013 | Meyers | B60R 16/0215 248/68.1 |
| 2014/0008501 | A1 * | 1/2014 | Satou | B60R 13/0275 248/68.1 |

FOREIGN PATENT DOCUMENTS

FR 2040091 A5 1/1971
GB 1296677 A 11/1972

\* cited by examiner

TUBE-RETAINING CLIP ASSEMBLY

RELATED APPLICATIONS

This application is a National Phase of International Application No. PCT/US2014/016698 filed Feb. 17, 2014 and relates to and claims priority benefits from U.S. Provisional Patent Application No. 61/806,510 filed Mar. 29, 2013, which is hereby incorporated by reference in its entirety.

This National Phase of International Application No. PCT/US2014/016698 also relates to and claims priority benefits from U.S. Provisional Patent Application No. 61/840,110 filed Jun. 27, 2013, which is hereby incorporated by reference in its entirety.

FIELD OF EMBODIMENTS OF THE DISCLOSURE

Embodiments of the present disclosure generally relate to tube-retaining clip assemblies configured to securely engage conduits, rods, tubes, cylindrical structures, or the like.

BACKGROUND

Various components, such as conduits and tubes, may be secured to surfaces, such as walls, ceilings or the like, through fastening assemblies. For example, a cylindrical tube may be secured to a wall through a fastening assembly having a tube channel that snapably, latchably, or otherwise secures around a portion of the tube. The fastening assembly itself may be secured to the wall through a stud that is received and retained by a stud retainer, such as shown and described in United States Patent Application Publication No. 2006/0099049, filed Sep. 16, 2005, and U.S. Pat. No. 8,328,488, filed May 7, 2008, both of which are hereby incorporated by reference in their entireties.

U.S. Pat. No. 6,216,986 discloses a clip with flexible locking arms. The clip includes two locking arms with proximal segments joining the outer periphery, distal segments forming a tube pocket, and hinge elements between the proximal segments and the distal segments. The distal segments include outwardly turned locking elements. An interior frame joined to the outer periphery includes locking pockets complementary to the locking elements. A tube pocket is formed between the distal segments of the locking arms and a portion of the interior frame. As the distal segments of the locking arms flex outwardly in response to the insertion of a tubular element, the outwardly turned locking elements are urged into the locking pockets.

However, known clips may not provide a suitable clearance area for a tube during installation. Further, known clips may not securely and reliably retain tubes. As such, tubes may be susceptible to undesirably ejecting from the clips.

SUMMARY OF EMBODIMENTS OF THE DISCLOSURE

Embodiments of the present disclosure provide a clip assembly configured to securely connect at least one tubular member to a structure. The clip assembly may include a base connected to one or more lateral walls, and at least one tube cradle connected to one or both of the base and the lateral wall(s). The tube cradle(s) defines a tube-receiving channel configured to receive the tubular member(s). At least one tube-retaining locking arm is configured to securely retain the tubular member(s) within the tube-receiving channel. The tube-retaining locking arm(s) is configured to flex toward the lateral wall(s) as the tubular member(s) is inserted into the tube-receiving channel. The tube-retaining locking arm(s) securely connects to the lateral wall(s) when the tubular member(s) is received within the tube-receiving channel to securely retain the tubular member(s) within the tube-receiving channel.

In at least one embodiment, each tube-retaining locking arm may include an apex connected to a lateral wall, a canted extension beam that downwardly angles from the apex toward a central axial plane of the clip assembly, and a tube-contacting beam extending back from the canted extension beam toward the lateral wall. The tube-contacting beam may include a distal catch configured to securely latch onto a protuberance of the lateral wall.

The tube-retaining locking arm may form a triangular retainer with respect to the lateral wall(s) when the tubular member(s) is received within the tube-receiving channel. In at least one embodiment, first and second tube-retaining locking arms may be used. For example, the first tube-retaining locking arm may include a first distal catch, and the second tube-retaining locking arm may include a second distal catch. The first distal catch may span a first half depth or less of the clip assembly, while the second distal catch may span a second half depth or less of the clip assembly. The first half depth may be opposite from the second half depth.

In at least one embodiment, at least two tube cradles may be used. For example, two tube cradles may be connected together by a flexion joint. The flexion joint may be configured to allow the two tube cradles to pivot toward and away from one another.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Figure 1:
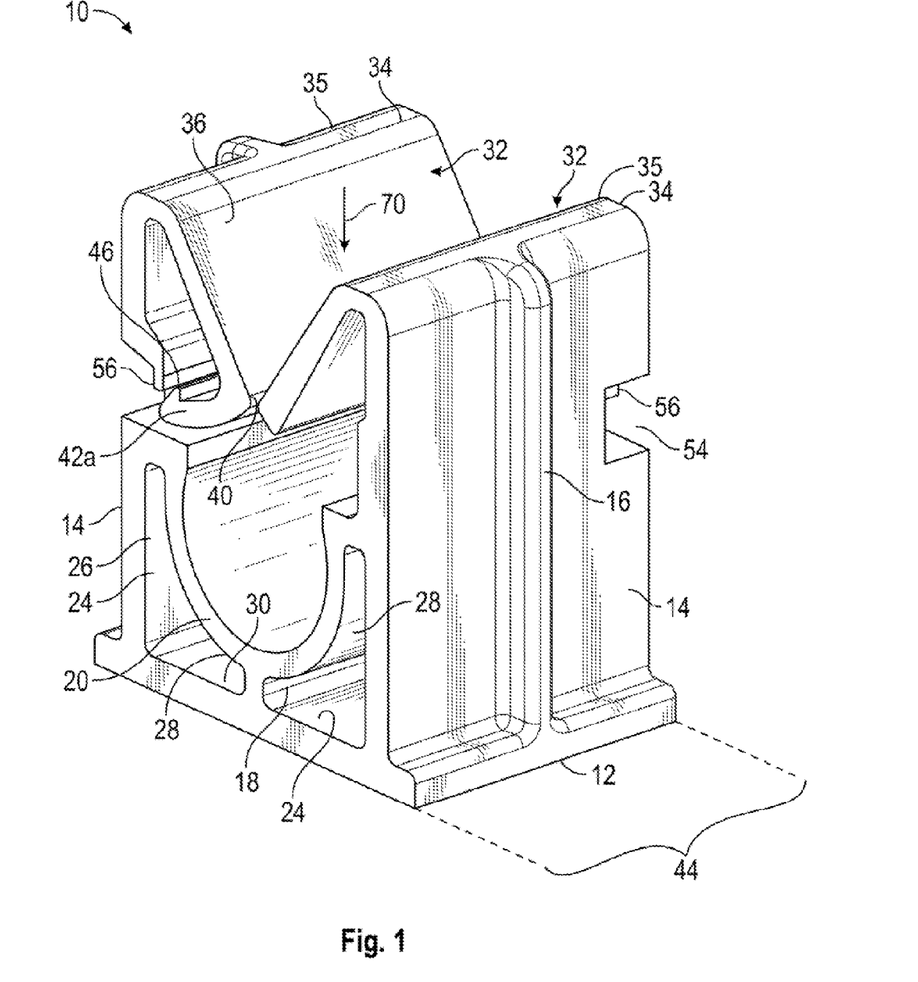
FIG. 1 illustrates a perspective top view of a clip assembly, according to an embodiment of the present disclosure.
Figure 2:
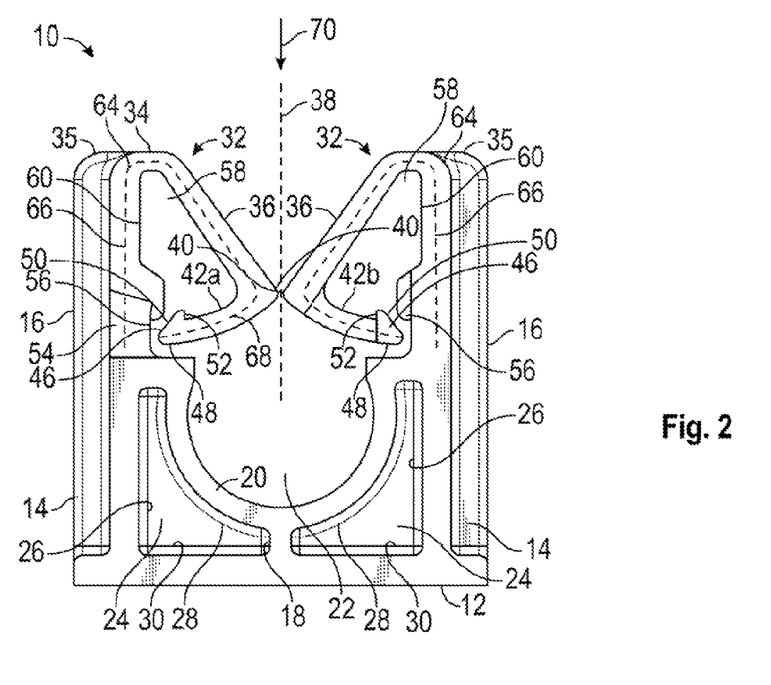
FIG. 2 illustrates a front view of a clip assembly, according to an embodiment of the present disclosure.

FIG. 1 illustrates a perspective top view of a clip assembly 10, according to an embodiment of the present disclosure. FIG. 2 illustrates a front view of the clip assembly 10. Referring to FIGS. 1 and 2, the clip assembly 10 may be integrally molded and formed as a single piece. For example, the clip assembly 10 may be a unitary piece of injection-molded plastic. Optionally, the clip assembly 10 may be formed of metal, such as aluminum. Also, alternatively, the clip assembly 10 may be formed from individual pieces that are fastened together.

The clip assembly 10 includes a base 12 connected to upright lateral walls 14. Each lateral wall 14 may be reinforced with a central rib 16 that increases a rigidity of the lateral wall 14. The central rib 16 may extend from a top portion of the lateral wall 14 to a bottom portion. Alternatively, the central rib 16 may extend between areas between the top and bottom portions. The central rib 16 may be a contiguous rib. Alternatively, the central rib 16 may include a plurality of separate and distinct pieces separated by gaps.

A support column 18, such as a fin, panel, beam, or the like, may extend upwardly from a central area of the base 12 and connect to an arcuate tube cradle 20, which defines a tube-receiving channel 22 that is configured to receive and retain a tubular member, such as a conduit, tube, cylinder, rod, or the like. Open spaces 24 may be formed between inner surfaces 26 of the lateral walls 14, lower surfaces 28 of the tube cradle 20, the central support column 18, and upper surfaces 30 of the base 12. The open spaces 24 provide flexibility to the clip assembly 10 and decrease the total amount of material used to form the clip assembly 10. Alternatively, however, the clip assembly 10 may not include the open spaces 24, but, instead, include contiguous material formed therein, thereby providing a more rigid clip assembly.

One or more stud retainers (not shown), such as one or more openings defined by threaded internal edges, may be formed through the base 12. The stud retainer(s) are configured to receive a stud or fastener so that the clip assembly 10 may be securely fastened to a surface, such as a wall, ceiling, floor, and/or the like. Alternatively, instead of a stud retainer, the base 12 may be secured to a surface through a tree-shaped feature, W-base, W-prong, welding, box prong, heart-shaped flexible member, and/or adhesively secured, such as through glue.

Opposed tube-retaining locking arms 32 extend inwardly from the lateral walls 14 above the tube cradle 20. Each locking arm 32 includes an apex 34 extending inwardly from a distal end 35 (such as a top end, as shown in FIGS. 1 and 2) of a lateral wall 14. The apex 34 connects to a canted extension beam 36 that angles downwardly from the apex 34 toward a central axial plane 38 of the clip assembly 10. As such, the canted extension beams 36 of the opposed locking arms 32 merge toward outer edges 40 of each other. As shown, the outer edges 40 may not connect to or abut into one another.

Tube-abutting beams 42 extend in opposite directions in relation to respective extension beams 36 proximate to the outer edges 40. As shown, each tube-abutting beam 42 extends back toward an inner surface of a lateral wall 14 away from the central axial plane 38. As shown, the clip assembly 10 may include a tube-abutting beam 42a at one end and a tube-abutting beam 42b at an opposite end. As such, the tube-abutting beams 42a and 42b may not extend over an entire depth 44 of the clip assembly 10. Instead, the tube-abutting beam 42a may extend over a length that is less than or equal to a half portion of the depth 44, while the opposite tube-abutting beam 42b may extend over a length that is less than or equal to the other half portion of the depth 44. Alternatively, the tube-abutting beams 42a and 42 may be mirror images of one another and extend over a length that is less than or equal to an entire depth 44 of the clip assembly 10.

Each tube-abutting beam 42 includes a catch 46 at a distal end 48. The catch 46 may be a hook, clasp, barb, latch, or the like having an outer ramped surface 50 integrally connected to a straight edge 52. Each catch 46 is proximate to a channel 54 formed through a lateral wall 14. When a tube is inserted into the tube-receiving channel 22, the locking arms 32 are configured to spread open so that the catches 46 move into respective channels 54. The catches 46 are configured to securely mate with reciprocal protuberances, such as tabs 56, extending from the lateral walls 14 over the channels 54.

As shown, open spaces 58 are formed between interior surfaces 60 of the lateral walls 14, the apexes 34, the extension beams 36, and the tube-abutting beams 42. The open spaces 58 provide flexibility to the locking arms 32. Optionally, in order to provide increased rigidity, material, such as plastic, may be within the open spaces 58.

The locking arms 32 form triangles 64 with respect to the lateral walls 14. For example, a portion 66 of the lateral wall 14 forms one side of the triangle 64 that connects to the extension beam 36, which is the other side of the triangle 64, at the apex 34. The tube-abutting beam 42 forms the base 68 of the triangle 64. As shown in FIG. 2, when the catch 46 is not connected to the tab 56, the triangle 64 may not be fully-formed. When the catch 46 connects to the tab 56, the triangle 64 may be fully-formed.

In operation, a tubular member is positioned between the locking arms 32 over the tube-receiving channel 22. The tubular member is then urged toward the tube-receiving channel 22 in the direction of arrow 70. As the tubular member slides over the extension beams 36, the locking arms 32 flex toward the lateral walls 14 such that the catches 46 pass into the respective channels 54. As the tubular member passes into the tube-receiving channel 22, bottom surfaces of the tube-abutting beams 42a and 42b rest over the tubular member, while the straight edges 52 of the tube-abutting beams 42a and 42b securely catch on the tabs 56, thereby fully-forming the triangles 64 and preventing the locking arms 32 from flexing back to the at-rest positions shown in FIGS. 1 and 2. As such, the locking arms 32 secure the tubular member within the tube-receiving channel 22 and prevent the tubular member from ejecting out of the tube-receiving channel 22 in a direction that is opposite that of the arrow 70.

Figure 3:
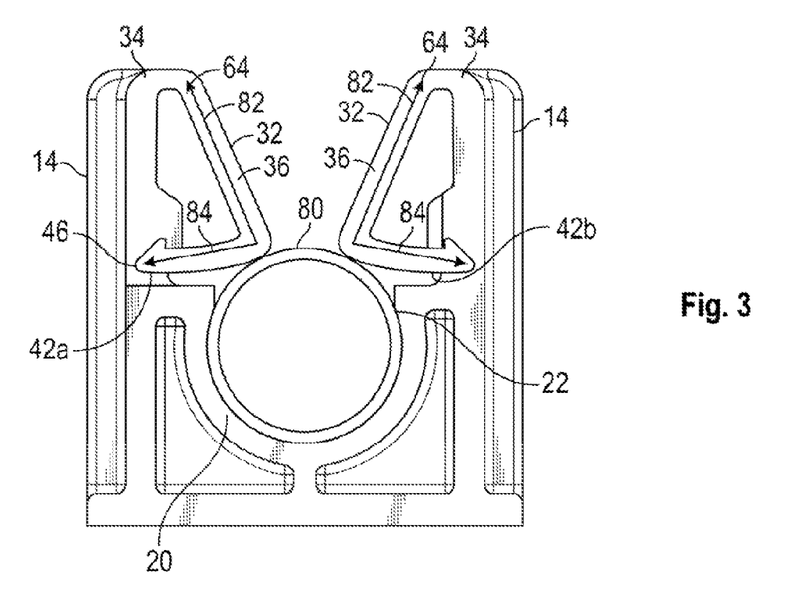
FIG. 3 illustrates a front view of a clip assembly retaining a tubular member, according to an embodiment of the present disclosure.

FIG. 3 illustrates a front view of the clip assembly 10 retaining a tubular member 80, according to an embodiment of the present disclosure. As shown, when the tubular member 80 is retained within the tube-receiving channel 22, the tubular member 80 exerts forces into lower surfaces of the tube-abutting beams 42a and 42b. Each of the exerted forces has a force component 82 that is exerted along the extension beams 36 and a force component 84 that is exerted along the tube-abutting beams 42a and 42b, respectively. The force components 82 and 84 are transferred to the lateral walls 14, which are relatively rigid, as compared to the locking arms 32. The movement of the tubular member 80 into the tube-receiving channel 22 forces the locking arms 32 to spread out, such that the catches 46 securely catch on the tabs 56 (shown in FIG. 2). As such, the locking arms 32 are prevented from flexing back toward their at-rest positions, and the tube-abutting beams 42a and 42b firmly extend over portions of the tubular member 80, thereby preventing the tubular member 80 from ejecting out of the clip assembly 10.

Embodiments of the present disclosure provide a tube-retaining clip assembly 10 that forms a triangular retainer, such as a triangular retaining profile or structure, when a tubular member is inserted into a tube-retaining channel 22. The triangular retaining profile or structure formed by the locking arms 32 resists removal or ejection of the tubular member from the clip assembly 10. The triangular retaining profile or structure transfers forces, such as those caused by stress concentration, to the outer periphery, such as the rigid lateral walls 14, of the clip assembly 10. Because the locking arms 32 are flexible, the clip assembly 10 allows for decreased insertion force of a tubular element into the tube-receiving channel 22. However, once the tubular member 80 is inserted into the tube-receiving channel 22, the catches 46 securely latch onto the tabs 56 of the lateral walls 14, thereby providing a robust and reliable retaining force that is exerted into the tubular member.

Due to the resulting triangular retaining profile or structure formed by the locking arms 32, the outer periphery, including the lateral walls 14, may be decreased in size and thickness, as compared to known clips. Transferring the retaining forces from the flexible locking arms 32 to the rigid lateral walls 14 provides a robust, reliable clip assembly 10 that may be smaller and lighter than known clips.

As compared to known clips, embodiments of the present disclosure exhibit stronger and more reliable retention force, and decreased tube insertion force, due to the flexible, resilient nature of the locking arms 32 and the resulting triangular retainer, such as the triangular retaining profile or structure. As such, the embodiments of the present disclosure provide clip assemblies that are less susceptible to disengaging a tubular member, while also allowing for easier installation of the tubular member.

Figure 4:
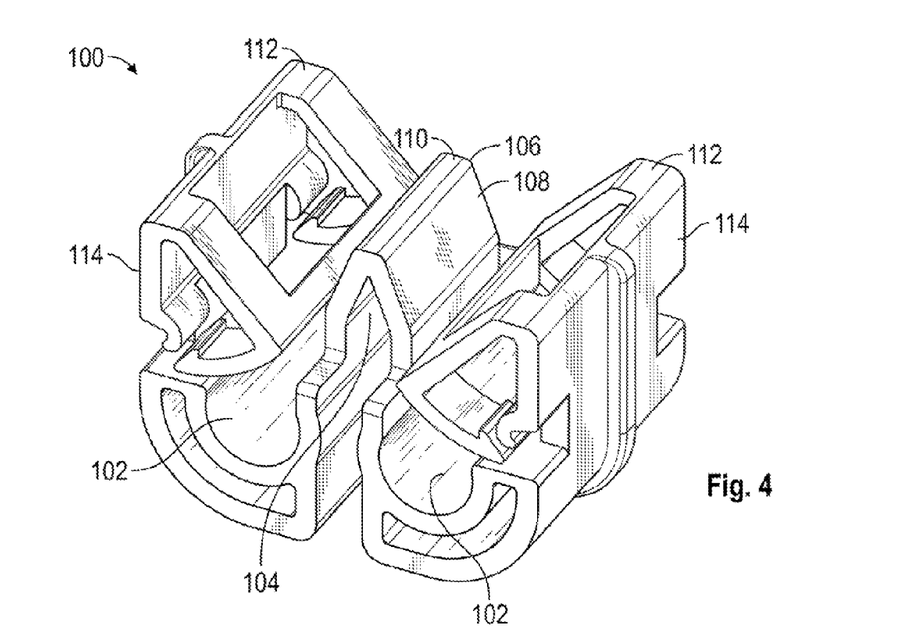
FIG. 4 illustrates a perspective top view of a clip assembly, according to an embodiment of the present disclosure.
Figure 5:
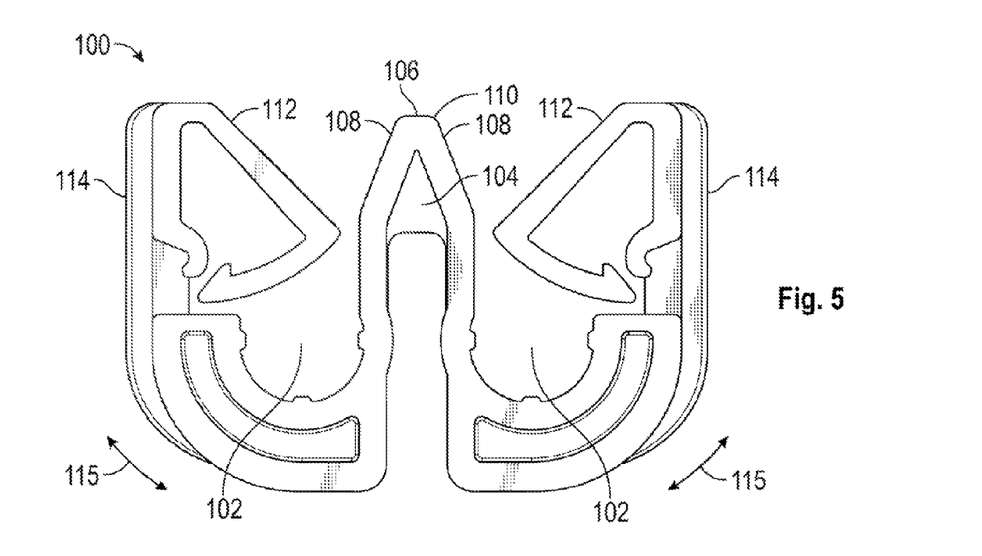
FIG. 5 illustrates a front view of a clip assembly, according to an embodiment of the present disclosure.

FIG. 4 illustrates a perspective top view of a clip assembly 100, according to an embodiment of the present disclosure. FIG. 5 illustrates a front view of the clip assembly 100. The clip assembly 100 may be similar to the clip assembly 10, although the clip assembly 100 may be configured to securely retain two tubular members. In general, embodiments of the present disclosure provide clip assemblies that may be configured to securely retain one or more tubular members.

The clip assembly 100 includes two tube-receiving channels 102 connected by a central intermediate flexion joint 104. A central outer member 106 extends upwardly from the intermediate flexion joint 104. The central outer member 106 includes ramped surfaces 108 that connect to an apex 110. Locking arms 112, similar to those described above, extend from lateral walls 114 on either side of the central outer member 106. Each locking arm 112 is configured to form a triangular retainer, such as a triangular retaining profile or structure, when a tubular member is inserted into a respective tube-receiving channel 102, as described above.

A tubular member is configured to be retained by the locking arm 112 within the tube-receiving channel 102, as described above. As such, a single locking arm 112 (as opposed to opposed locking arms) may be configured to securely retain a tubular member within the tube-receiving channel 102. Alternatively, the clip assembly 100 may include locking arms, as described above, extending from the central outer member 106.

As shown in FIG. 5, in particular, each half of the clip assembly 100 may flex toward and away from the other half by way of the flexion joint 104. For example, each half of the clip assembly 100 may flex about the flexion joint 104 in directions denoted by arcs 115.

Figure 6:
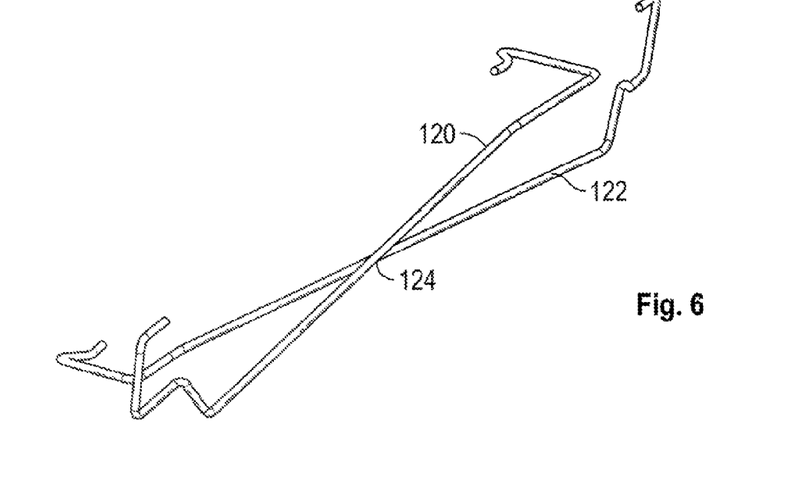
FIG. 6 illustrates a perspective top view of torsion bars onto which a clip assembly is configured to be secured, according to an embodiment of the present disclosure.

FIG. 6 illustrates a perspective top view of torsion bars 120 and 122 onto which the clip assembly 100 is configured to be secured, according to an embodiment of the present disclosure. Various vehicles include torsion bars, such as the torsion bars 120 and 122, within a trunk, for example. The torsion bars 120 and 122 may be positioned below a package shelf, for example. The torsion bars 120 and 122 may operate as springs to open a deck lid and/or a trunk lid. In general, the torsion bars 120 and 122 may connect to one another at an area 124 that may be proximate to a latitudinal center of a trunk, for example.

Referring to FIGS. 4-6, the clip assembly 100 may be used to securely connect to the torsion bars 120 and 122 together at the area 124. The clip assembly 100 may provide a spacer between the torsion bars 120 and 122 so that the torsion bars 120 and 122 do not directly contact one another.

The clip assembly 100 may be configured to connect and flex at the area 124 in which the two torsion bars 120 and 122 are closest to one another, for example. The angle between the two torsion 120 and 122 bars may vary, depending on a desired configuration, tolerance in manufacturing, and/or when the torsion bars 120 and 122 move as the deck or trunk lid is opened or closed. The clip assembly 100 is configured to accommodate different flex angles without compromising bar retention strength.

The embodiment shown and described with respect to FIG. 6 is merely an example of one application of the clip assembly 100. It is to be understood that the clip assembly 100 may be used with various other devices, components, and the like.

Figure 7:
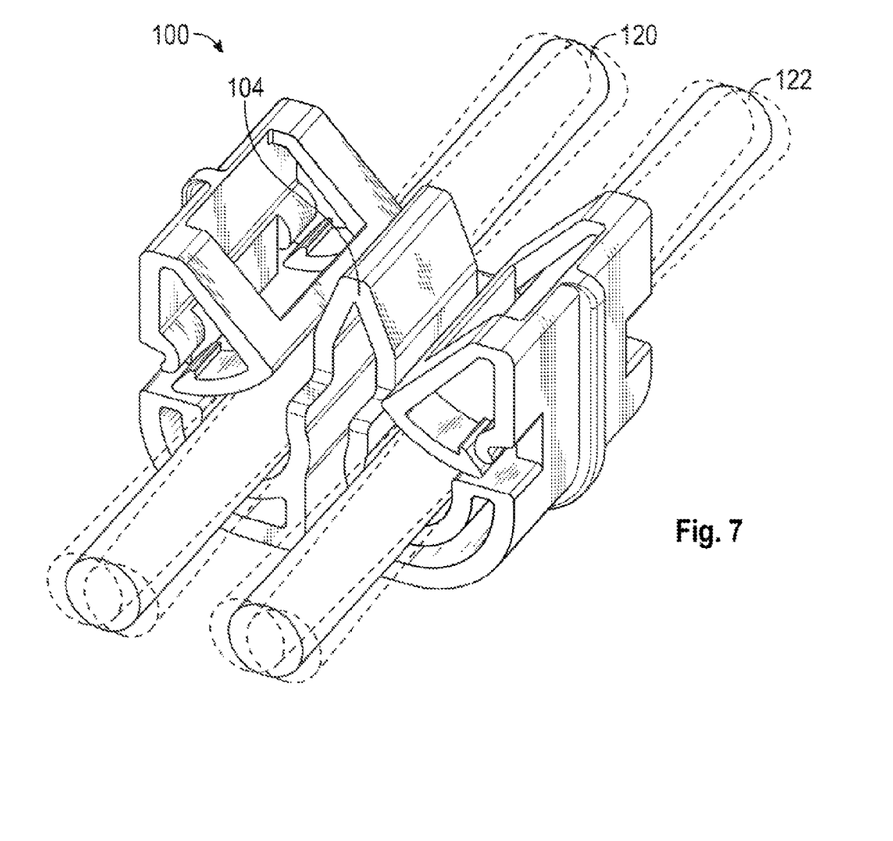
FIG. 7 illustrates a perspective top view of a clip assembly retaining two torsion bars, according to an embodiment of the present disclosure.

FIG. 7 illustrates a perspective top view of the clip assembly 100 retaining the two torsion bars 120 and 122, according to an embodiment of the present disclosure. Referring to FIGS. 4-7, the central flexion joint 104 is configured to flex in order to accommodate different angles associated with the torsion bars 120 and 122. The central flexion joint 104 is configured to accommodate various angles between the torsion bars 120 and 122 in installed positions. As the torsion bars 120 and 122 move and/or rotate (such as when a deck or trunk lid is opened or closed), the flexion joint 104 may flex and move in relation thereto in order to resiliently retain the torsion bars 120 and 122.

Embodiments of the present disclosure provide a clip assembly that is easy to install onto torsion bars, thereby reducing assembly time, in contrast to known clips that have fold-over features that typically require a longer installation process. Further, embodiments of the present disclosure provide a clip assembly having a flexible body that accommodates various angles between the torsion bars. Further, embodiments of the present disclosure provide a clip assembly having a reduced mass, as compared to previously-known clips, as there may not be any fold-over feature.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

Various features of the disclosure are set forth in the following claims.

The invention claimed is:

1. A clip assembly configured to securely connect at least one tubular member to a structure, the clip assembly comprising:
   a base connected to one or more lateral walls;
   at least one tube cradle connected to one or both of the base and the one or more lateral walls, wherein the at least one tube cradle defines a tube-receiving channel configured to receive the at least one tubular member; and
   at least one tube-retaining locking arm configured to securely retain the at least one tubular member within the tube-receiving channel, wherein the at least one tube-retaining locking arm is configured to flex toward the one or more lateral walls as the at least one tubular member is inserted into the tube-receiving channel, wherein the at least one tube-retaining locking arm securely connects to the one or more lateral walls when the at least one tubular member is received within the tube-receiving channel to securely retain the at least one tubular member within the tube-receiving channel, wherein the at least one tube-retaining locking arm forms a triangular retainer with respect to the one or more lateral walls when the at least one tubular member is received within the tube-receiving channel, wherein the at least one tube-retaining locking arm includes a catch at a distal end, wherein the catch moves from a disconnected state in relation to the one or more lateral walls into a connected state with the one or more lateral walls when the at least one tubular member is received within the tube-receiving channel, wherein the at least one tube-retaining locking arm comprises: (a) an apex directly connected to and directly extending from the one or more lateral walls, (b) a canted extension beam that downwardly angles from the apex toward a central axial plane of the clip assembly without user intervention when the at least one tubular member is outside of the tube-receiving channel; and (c) a tube-contacting beam extending back from the canted extension beam toward the one or more lateral walls without user intervention, wherein the tube-receiving channel is configured to receive the at least one tubular member when the canted extension beam downwardly angles from the apex toward the central plane of the clip assembly and the tube-contacting beam extends back from the canted extension beam toward the one or more lateral walls when the at least one tubular member is outside of the tube-receiving channel.

2. The clip assembly of claim 1, wherein the tube-contacting beam includes the catch at the distal end, wherein the catch is configured to securely latch onto the one or more lateral walls when the at least one tubular member is received within the tube-receiving channel.

3. The clip assembly of claim 1, wherein the at least one tube-retaining locking arm comprises first and second tube-retaining locking arms.

4. The clip assembly of claim 3, wherein the first tube-retaining locking arm includes a first catch, and the second tube-retaining locking arm includes a second catch, wherein the first catch spans a first half depth or less of the clip assembly, wherein the second catch spans a second half depth or less of the clip assembly, and wherein the first half depth is opposite from the second half depth.

5. The clip assembly of claim 1, wherein the at least one tube cradle comprises at least two tube cradles.

6. The clip assembly of claim 1, wherein the at least one tube cradle comprises two tube cradles connected together by a flexion joint.

7. The clip assembly of claim 6, wherein the flexion joint is configured to allow the two tube cradles to pivot toward and away from one another.

8. A clip assembly configured to securely connect a tubular member to a structure, the clip assembly comprising:
   a base connected to first and second lateral walls;
   a tube cradle connected to the base and the lateral walls, wherein the tube cradle defines a tube-receiving channel configured to receive the tubular member; and
   first and second tube-retaining locking arms extending from the first and second lateral walls, respectively, wherein each of the first and second tube-retaining locking arms is configured to securely retain the tubular member within the tube-receiving channel, wherein the first and second tube-retaining locking arms are configured to flex toward the first and second lateral walls, respectively, as the tubular member is inserted into the tube-receiving channel, and wherein the first and second tube-retaining locking arms securely connect to the first and second lateral walls, respectively, when the tubular member is received within the tube-receiving channel to securely retain the tubular member within the tube-receiving channel, wherein the first and second tube-retaining locking arms forms triangular retainers with respect to the first and second lateral walls, respectively, when the tubular member is received within the tube-receiving channel, wherein each of the first and second tube-retaining locking arms includes a catch at a distal end, wherein the catch moves from a disconnected state in relation to the first or second lateral walls into a connected state with the first or second lateral walls when the tubular member is received within the tube-receiving channel, wherein each of the first and second tube-retaining locking arms comprises: (a) an apex directly connected to and directly extending from one of the first or second lateral walls, (b) a canted extension beam that downwardly angles from the apex toward a central axial plane of the clip assembly without user intervention when the tubular member is outside of the tube-receiving channel; and (c) a tube-contacting beam extending back from the canted extension beam toward one of the first or second lateral walls without user intervention, wherein the tube-receiving channel is configured to receive the tubular member when the canted extension beam downwardly angles from the apex toward the central plane of the clip assembly and the tube-contacting beam extends back from the canted extension beam toward one of the first or second lateral walls when the tubular member is outside of the tube-receiving channel.

9. The clip assembly of claim 8, wherein the tube-contacting beam includes the catch at the distal end, wherein the catch is configured to securely latch onto a protuberance of one of the first or second lateral walls.

10. The clip assembly of claim 8, wherein the first tube-retaining locking arm includes a first catch, and the second tube-retaining locking arm includes a second catch, wherein the first catch spans a first half depth or less of the clip assembly, wherein the second catch spans a second half depth or less of the clip assembly, and wherein the first half depth is opposite from the second half depth.

11. The clip assembly of claim 8, further comprising at least one additional tube cradle.

12. The clip assembly of claim 8, further comprising a flexion joint that connects the tube cradle to an additional tube cradle.

13. The clip assembly of claim 12, wherein the flexion joint is configured to allow the tube cradle to pivot toward and away from the additional tube cradle.

\* \* \* \* \*